April 1, 1969     E. C. POLK     3,436,085
SEALING STRUCTURE EMBODYING DEFORMABLE RING
Filed Jan. 19, 1966
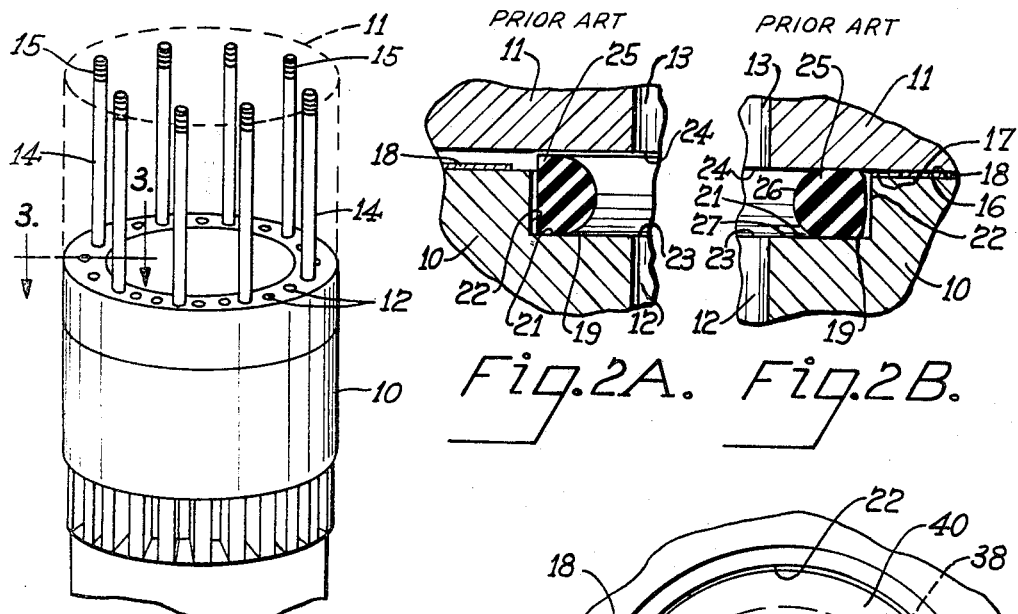
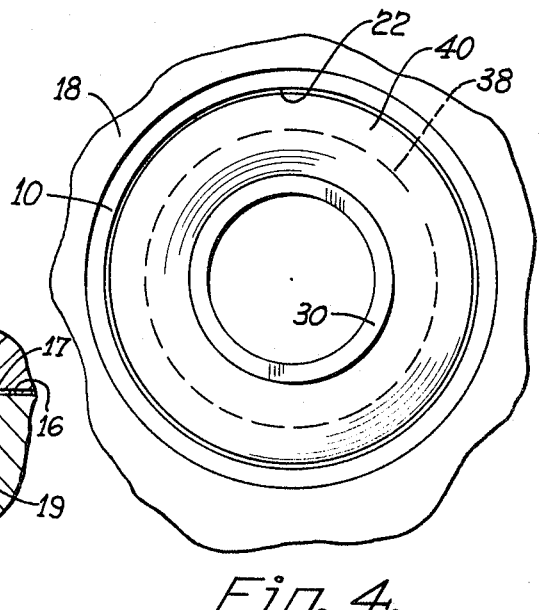
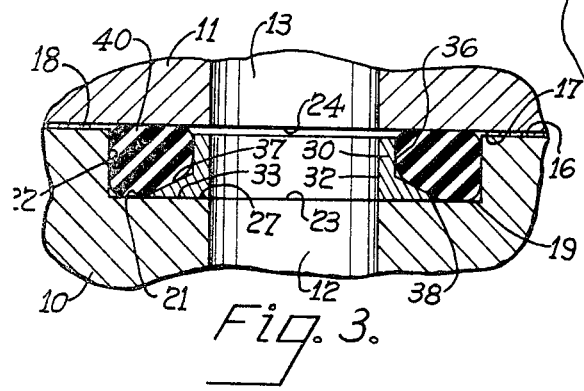
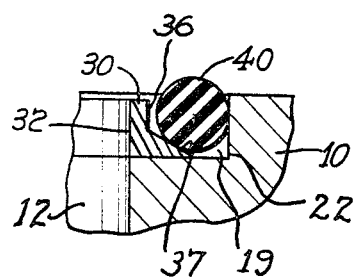
INVENTOR.
EDWIN C. POLK
BY
ATTORNEYS

United States Patent Office 3,436,085
Patented Apr. 1, 1969

3,436,085
SEALING STRUCTURE EMBODYING DEFORMABLE RING
Edwin C. Polk, Lyndhurst, Ohio, assignor to Cleveland Technical Center, Inc., Cleveland, Ohio, a corporation of Delaware
Filed Jan. 19, 1966, Ser. No. 521,736
Int. Cl. F16j *15/00;* F16k *41/00*
U.S. Cl. 277—165                    7 Claims

ABSTRACT OF THE DISCLOSURE

A sealing structure for sealing against the escape of fluid the juncture between two adjoining members that define a passage through which fluid passes, which sealing structure embodies a recess in one of the members adjacent to the juncture, a supporting ring in the recess having an inner opening that is a continuation of the passage and a frusto-conical outer surface portion, and a deformable sealing ring surrounding the supporting ring and forced against the outer wall of the recess and the surface of the member other than the one with the recess at the juncture to provide a seal. The supporting ring minimizes turbulence of fluid flowing past the juncture and also provides improved sealing.

---

This invention relates to fluid-tight sealing structures and more particularly to fluid-tight sealing structures adapted to define a positive fluid-tight seal between mating members that are rigidly secured together.

It is known to provide a fluid-tight sealing structure between fluid-conducting passages in mating members that are rigidly secured together, by providing one of the members with a counterbore around the passage, and locating a suitable resilient ring in the counterbore, the cross section of the ring being of such size and shape that it is compressed when the two members are secured together. Frequently, these rings have a circular cross section and are termed O rings; often these rings are D-shaped in cross section and are known as D rings. In a sealing structure embodying either the D ring or the O ring, the passages in the respective members are connected together through an irregular wall section defined by the interior surface of the O ring or the D ring and the edges of the ports of the passages. Such irregular sections cause turbulence in the fluid flowing through the passage and result in cavitation or erosion of the sealing ring seating surfaces in the sealed members, or of the sealing ring itself. Further, such turbulence can substantially reduce the fluid flow rate through the passage. Still further, the resilient sealing ring is susceptible of sufficient movement within the counterbore to remove the area of maximum compression of the ring to a location remote from the joint to be sealed, with consequent impairment of the sealing structure.

These difficulties are particularly prevalent and troublesome in sealing structures for forming water-tight seals at the joints between cooling water passages of cylinder blocks and cylinder heads of locomotive diesel engines. The conditions of varying heat and temperature, and different rates of water flow, cause undesirably frequent leakage or failure of conventional O or D ring sealing structures at these joints. Such failure or leakage necessitates expensive repairs and costly locomotive downtime.

Accordingly, it is an object of this invention to provide an improved fluid-tight sealing structure.

Another object of this invention is to provide a fluid-tight sealing structure which minimizes fluid cavitation, erosion of sealing surfaces or the sealing ring, thus increasing the effective life of the sealing structures; still another object of this invention is to provide a seal having provision for positive location and seating of a resilient sealing ring in a counterbore.

A further object of this invention is to provide a fluid-tight seal which gives positive sealing at the bottom of such a counterbore, the surface facing the bottom of the counterbore, and at the side wall of the counterbore.

Yet, a further object of this invention is to provide a fluid sealing structure from which parts can easily be removed and reused.

Still, another object of this invention is to provide between mating members a fluid-tight sealing structure that provides a substantially smooth path for fluid between passages in the respective members, thus reducing or eliminating turbulence that can cause cavitation, erosion or other undesirable effects.

Yet a further object of this invention is to provide a fluid-tight sealing assembly that is particularly adapted to provide a durable tight joint even though the sealing structure is subjected to elevated temperatures and pressures.

The invention possesses other objects and features of advantage some of which, with the foregoing, will be set forth in the following description of a preferred embodiment of the invention which is illustrated in the drawings accompanying and forming a part of the specification. It is to be understood that the invention is not limited to the specific embodiment shown in the drawing and described herein, as various other embodiments may employ the concepts thereof without departing from the scope of the present invention as set forth in the claims.

Referring to the drawings:

FIGURE 1 is a fragmentary perspective view of a diesel engine cylinder block assembly, the head being shown in phantom, in which sealing structures of this invention may be embodied to form water-tight seals of the joints between the coolant passages in the head and block;

FIGURES 2A and 2B are views in section of a prior art sealing structure, FIGURE 2A showing a structure embodying a D ring prior to compression between the head and the block, and FIGURE 2B showing the head and block secured in abutting or mating engagement with the sealing structure complete, these views being to an enlarged scale relative to FIGURE 1;

FIGURE 3 is a fragmentary enlarged sectional elevation, through one of the coolant passages and generally along line 3—3 of FIGURE 1 and showing the details of one illustrative embodiment of a fluid sealing structure according to this invention, after assembly;

FIGURE 4 is a plan view of the structure of FIGURE 3 prior to mounting the cylinder head; and FIGURE 5 is a fragmentary view in section, corresponding generally to the right-hand portion of FIGURE 4, of a portion of the sealing structure of FIGURE 3, but with the cylinder head removed to relieve the compression on the resilient sealing ring.

Referring now to the drawing for structural features that are common in both the illustrated prior art structure and the illustrated embodiment of the invention, FIGURE 1 shows in perspective an assembly of a conventional diesel engine cylinder block 10 and attached cylinder head 11, in which assembly the later described sealing structure embodying the invention may be employed to seal the mating coolant passages 12 and 13 (FIGURES 2A, 2B and 3) therein. The cylinder block 10 has a number of head studs 14 each threaded at 15 to receive conventional nuts, not shown, for securing the cylinder head 11 in abutting or mating relationship on the flat surfaces 16 and 17 of the block 10 and head 11 with a conventional gasket 18 sandwiched therebetween. The cylinder block 10 includes a plurality of passages 12, and the head mating passages 13, through which a suitable coolant such as water passes and is circulated through a conventional radiator, not shown.

Block 10 has a conventional counterbore 19 which has a flat bottom surface 21 and an outer wall surface 22 perpendicular thereto, in which a resilient sealing ring is to be mounted. Gasket 18 is positioned between the block 10 and the head 11 in a manner well known in the art and preferably terminates in an edge displaced from the bore wall 22. Block 10 has a circular port 23 coaxially aligned with passage 12 and head 11 has circular port 24 coaxially aligned with passage 13. Counterbore bottom surface 21 is normal to the axis of port 23 and passage 12.

As shown in FIGURES 2A and 2B, in conventional practice the sealing ring 25 when uncompressed has a depth greater than the depth of the counterbore wall 22. After the head 11 is pulled snugly against the gasket 18 by means of nuts, not shown, that engage the threaded portions 15 of the head studs 12, the sealing ring 25 is compressed into a general configuration shown in FIGURE 2B. It is to be noted that the ports 23 and 24 are then essentially coaxially aligned but in conventional practice are connected by an irregular section defined by the inner curved surface 26 of the sealing ring 25 and the edges of the ports 23, 24. This irregular section between passages 12 and 13 creates, in the coolant liquid passing through such passages, turbulence that can result in cavitation or erosion of the seat 21, particularly at its inner portion 27.

FIGURES 3 through 5 are views of one illustrative sealing structure embodying this invention, in which a metallic ring 30 aids in supporting sealing ring 40 and urging it into sealing contact with block 10 and head 11 to seal passages 12 and 13. The ring 30 includes a smooth cylindrical inner surface 32 that has an axial length slightly less than the height of counterbore wall 22, and a diameter essentially the same as the diameters of the ports 23 and 24 and passages 12 and 13. Ring 30 terminates in a flat annular bottom surface 33, smaller than the diameter of the counterbore 19, that rests on the bottom surface 21 of the counterbore opposite the facing portion of surface 17 of the head 11. The outer surface of the ring 30 includes a generally cylindrical portion 36, and a generally frusto-conical portion 37 emerging from bottom surface 33. Preferably, portion 37 forms an acute angle with seat 21 and an obtuse angle with portion 36 when viewed as in FIGURES 3 and 5. When the head 11 is removed and the sealing ring 40 is in its relaxed condition as shown in FIGURE 5, the outer periphery of ring 40 approximates the diameter of the outer wall 22 of the counterbore, its inner periphery is larger than the outer periphery of cylinder portion 36 of ring 30, and it is sized and shaped to rest on generally frusto-conical surface 37 of ring 30. Preferably, the outer periphery of sealing ring 40 is slightly larger than the counterbore 19 to insure that the ring 40 is centered when it is pushed into the counterbore; the thus centered sealing ring can also aid in centering the supporting ring 30 by bearing on its frusto-conical surface 37.

After the head 11 is pulled down on the block 10 as previously described, the O ring 40 is compressed into a cross section shown in FIGURE 3. It will be apparent that the frusto-conical surface 37 of the metal ring 30 exerts a compressive force upon the sealing ring 40, the major component of which is directed generally toward the junction between the top of the counterbore wall 22 and the adjacent portion of the surface 17 of the head 11. It will also be apparent that the cylindrical side wall 36 of the metal ring 30 exerts on sealing ring 40 a force the major component of which is directed radially outwardly, thus to insure positive sealing of the ring 40 on the surface 22 of the counterbore 19. Further, a portion of the compressive force exerted by the head 11 upon the sealing ring 40 is transmitted to the frusto-conical surface 37 of the metal ring. This component of the compressive force tends to center or axially align support ring 30 relative to ports 23 and 24, and to force ring 30 tightly on to surface 21 of bore 19.

This combination of metal supporting ring 30 and resilient O ring 40 can be mounted in the counterbores of conventional diesel engines to provide a substantially smooth passage between the aligned ports 23 and 24 of the passages 12 and 13, thus greatly reducing or eliminating turbulence of the liquid passing through the passage. For this reason, and since the portion 27 of surface 21 of the bore is shielded by the tightly pressed ring from any flowing liquid, cavitation or erosion of the surface 21 can be eliminated. Since the sealing ring 40 is virtually completely shielded from flowing liquid, it too is protected from cavitation, erosion or other deterioration from the liquid. Reduction of turbulence of the flowing liquid also produces more uniform cooling of the cylinder block and head.

The combination and cooperation of the supporting ring 30 and the resilient sealing ring 40 produces improved sealing relationship at the junction of the coolant passages 12 and 13 of the mating cylinder block 10 and the cylinder head 11 because the ring 30 positively forces the sealing ring 40 into positive sealing contact with wall surface 22 of the block counterbore, while not interfering with positive sealing contacts of the ring 30 with bottom surface 21 of the block counterbore and opposed surface 17 of the head. As is apparent from FIGURE 2B, in conventional practice, the sealing ring is positively forced into sealing contact with only two surfaces 17 and 21. According to the present invention, the sealing ring 40 is positively forced into contact with three sealing surfaces 17, 21 and 22, with consequential greatly increased sealing effectiveness.

Although the sealing ring 40 is shown as an O ring, resilient sealing rings of other cross sectional shapes may be used, such as the D ring of FIGURE 2. Furthermore, the metal supporting and shielding ring 30 may have a cross sectional shape deviating somewhat from the exact shape shown.

The ring 30 may be formed of brass or other suitable material that permits it to be easily installed, removed or reused, and that resists attack by the liquid.

Although various resilient materials may be employed, it is preferred that the O ring be formed of a silicone rubber or the like because of its minimal tendency to flow at elevated temperatures.

Although only one preferred embodiment of the invention has been illustrated and described in detail, it will be apparent to those skilled in the art that the invention is not so limited, and that various modifications, including those mentioned above, may be made therein without departing from the spirit of the invention or from the scope of the appended claims. It is intended that the patent shall cover, by suitable expression in the appended claims, the novel features of the invention.

What is claimed is:

1. In a fluid seal between first and second members rigidly secured together in mating relationship:
   said first member having a first passage therein terminating in a port facing said second member,
   said second member having a passage therein terminating in a second port facing said first port and having a surface facing said first member;
   said first member having an annular recess therein surrounding said first port, said recess having a bottom surface facing and spaced from said surface on said second member and an outer wall surface spaced from said port and extending generally transversely to said bottom surface toward said surface of said second member;
   an annular supporting ring in said annular recess having a generally cylindrical inner surface aligned with said ports and an outer surface facing said outer wall surface of said recess and including a generally frusto-conical portion; and a deformable sealing ring surrounding and compressed into engagement with said supporting ring, said bottom and outer wall surfaces of said annular recess, and said surface of said second member so said frustoconical portion urges said sealing ring toward said juncture between said surface of said second member and said outer wall surface of said annular recess into sealing contact with said surfaces.

2. The combination according to claim 1 wherein the axial length of said supporting ring is substantially equal to but less than the depth of said annular recess and terminates in a surface bearing against said bottom surface of said annular recess whereby said supporting ring defines a substantially smooth fluid passage between said ports.

3. The combination according to claim 1 wherein said supporting ring inner surface extends from the bottom of said annular recess substantially the entire distance to said second member to define a substantially smooth fluid passage between said ports.

4. The combination according to claim 1 wherein the outer surface of said supporting ring includes a generally cylindrical portion intersecting said generally frustoconical portion, and wherein said sealing ring is a resilient ring that contacts both said generally cylindrical portions and said generally frustoconical portion of said supporting ring.

5. The combination according to claim 4 wherein said resilient sealing ring, in its unstressed condition, has a cross sectional diameter greater than the depth of said annular recess, an outer diameter approximating the diameter of said annular recess, and an inner diameter greater than the diameter of said generally cylindrical portion of said supporting ring, whereby said sealing ring rests upon said frustoconical portion prior to being compressed.

6. The combination according to claim 1 wherein said generally frustoconical portion defines an acute angle with the bottom of said annular recess.

7. The combination according to claim 4 wherein said generally cylindrical portion and said generally frustoconical portion intersect in an obtuse angle, as viewed in section.

References Cited

UNITED STATES PATENTS

| 2,679,241 | 5/1954 | Dickerson | 123—193 |
| 2,744,514 | 5/1956 | Vidmar | 123—193 |
| 2,783,295 | 2/1957 | Ewing | 285—349 X |
| 2,900,199 | 8/1959 | Logan | 277—188 X |

FOREIGN PATENTS

| 905,737 | 4/1945 | France. |
| 1,240,659 | 8/1960 | France. |
| 1,326,089 | 3/1963 | France. |

LAVERNE D. GEIGER, *Primary Examiner.*

JEFFREY S. MEDNICK, *Assistant Examiner.*

U.S. Cl. X.R.

277—117, 187; 92—169; 123—193, 41.79; 285—349, 379